United States Patent
Enderlin et al.

(10) Patent No.: US 12,113,370 B2
(45) Date of Patent: Oct. 8, 2024

(54) SENSOR ARRANGEMENT FOR A FOREIGN OBJECT DETECTION DEVICE

(71) Applicant: Delta Electronics (Thailand) Public Co., Ltd., Samutprakarn (TH)

(72) Inventors: Jonas Enderlin, Teningen (DE); Luca König, Wyhl (DE); Ulrich Richter, Freiburg (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 169 days.

(21) Appl. No.: 18/049,613

(22) Filed: Oct. 25, 2022

(65) Prior Publication Data

US 2023/0131711 A1    Apr. 27, 2023

(30) Foreign Application Priority Data

Oct. 25, 2021   (EP) ..................... 21204530

(51) Int. Cl.
*H02J 50/60* (2016.01)
*H02J 50/10* (2016.01)

(52) U.S. Cl.
CPC ............. *H02J 50/60* (2016.02); *H02J 50/10* (2016.02)

(58) Field of Classification Search
CPC ................................................ G01R 31/3183
See application file for complete search history.

(56) References Cited

U.S. PATENT DOCUMENTS

| 2014/0111019 A1 | 4/2014 | Roy et al. | |
| 2021/0101680 A1* | 4/2021 | Naderi | B64C 39/024 |
| 2022/0239160 A1* | 7/2022 | Sieber | H02J 50/60 |

FOREIGN PATENT DOCUMENTS

EP    3734801 A1    11/2020

OTHER PUBLICATIONS

The European search report of of the corresponding European application No. 21204530.6 issued on Mar. 25, 2022.

* cited by examiner

*Primary Examiner* — Tung X Nguyen
(74) *Attorney, Agent, or Firm* — CKC & Partners Co., LLC

(57) ABSTRACT

Provided are a sensor arrangement for a foreign object detection device for a wireless power transfer system, a foreign object detection and a primary part for a wireless power transfer system. The sensor arrangement includes multiple detection cells, each including a sense coil including a winding spirally wound in a plane and having multiple turns. Multiple input leads and one or more output leads are provided such that each detection cell may be connected to a current input and a current output. The sense coil of at least one detection cell includes an outer coil section and an inner coil section arranged inside the outer coil section, where a first distance between an outermost turn of the inner coil section and an innermost turn of the outer coil section is at least twice a largest distance between two turns of the outer coil section.

20 Claims, 8 Drawing Sheets

SENSOR ARRANGEMENT FOR A FOREIGN OBJECT DETECTION DEVICE

CROSS-REFERENCE TO RELATED APPLICATIONS

This application claims priority to European Patent Application No. 21204530.6, filed on Oct. 25, 2021, which is hereby incorporated by reference in its entirety.

TECHNICAL FIELD

The disclosure relates to a sensor arrangement for a foreign object detection device for a wireless power transfer system, including a current input and a current output, a multitude of detection cells, each including a sense coil including a winding spirally wound in a plane and having a multitude of turns, a multitude of input leads and one or more output leads, where each detection cell is connected between one of the input leads and one output lead and where each detection cell is connected to a different combination of input and output leads and an input selection circuit adapted to selectively establish an electrical connection between the current input and one or more of the input leads. The disclosure further relates to a foreign object detection device for a primary part of a wireless power transfer system for transferring power over an air gap to a nearby receiver, including such a sensor arrangement and a primary part for a wireless power transfer system for transferring power over an air gap to a nearby receiver including such a sensor arrangement or such a foreign object detection device.

BACKGROUND

Electrical energy is used in many different applications. To power electrically driven devices, items or objects that are not permanently connected to a source of electrical power, such devices, items or objects are often equipped with one or more batteries that are used to store energy for powering such a device, item or object when it is not connected to a power source. Examples are mobile devices such as cell phones, laptops, cordless screwdrivers and the like, household appliances, automotive vehicles such as cars, lorries, motorbikes, trains, boats, ships, planes, helicopters and the like but also industrial vehicles such as forklifts, automated guided vehicles (AGVs), cleaning machines, elevators and the like or electrically operated equipment for lifting, displacing or transporting goods of any kind. All these devices, items or objects usually include a battery for operating it.

Such batteries may be charged if the energy stored therein has been fully or partially consumed by the device, item or object that is operated therewith. Charging may be done by connecting a source of electrical energy to the battery by wires.

Another way to charge such batteries is wireless charging, usually by inductive power transfer via a magnetic field.

The power classes of wireless charging systems have a wide spectrum with an output power between 1 W and several 100 kW.

However, one of the problems with wireless charging are objects that are positioned in the magnetic field used for transferring the energy where it is usually not possible to mechanically prevent such objects of being positioned in proximity of the primary and/or secondary unit of the power transfer device. Especially magnetic and conductive objects such as for example coins, keys, tools, cans or other objects, can heat up in a magnetic field quickly by induced eddy currents and hysteresis losses. This unintentional conversion of electrical energy into heat energy causes additional losses and not least a danger for the system and the human or animal being in its environment. Due to the physical law, it is not possible to avoid such effects and the resulting heating. Accordingly, it is therefore important to detect the presence of such foreign objects to counteract the dangers. Such methods are also known as foreign object detection (FOD).

There are already various approaches to solve this problem. In some cases, a curved shape of the transmitting pad ensures that the objects move from the pad with the help of gravity. Another approach is to use sensors to detect the presence of metallic objects. For instance, capacitive sensors and optical sensors can be used, but they can easily be disturbed by environmental influences and non-metallic objects. Inductive sensors are more commonly used, because they are robust against environmental influences such as dirt and provide precise results in the near range at the same time. One kind of inductive sensors detects the reduction of the inductance of a coil due to induced eddy currents in the object to be detected, which counteract the primary field of the coil. With the finite conductivity of the object, also ohmic losses occur, which also may be detected. For the evaluation of these changes, several methods have been established in the state of the art, which are also used in the prior art stated below. It is well known to use arrays of sensor coils in order to increase the detection area while achieving a sufficient detection sensitivity.

One known technology for FOD includes the measuring of an impedance of a coil, which are arranged in a matrix of several coils and where the impedance of the coil is changed by the presence of a foreign object.

Document EP 3 734 801 for example discloses such a foreign object detection device. The FOD device includes a sensor arrangement, a stimulation unit, a measuring unit and a signal processing and control unit. The sensor arrangement comprises a multitude of detection cells that may be activated individually by means of multiplexers. Each detection cell includes a sense coil and, in order to improve the accuracy and the interference resistance of object detection, a capacitor to form a resonant circuit. The detection cells are usually arranged in a matrix of rows and columns such that a monitoring of larger areas is possible. A particular detection cell may be connected to a stimulation unit and to a measurement unit by means of an input multiplexer and an output multiplexer respectively using connecting lines that are fed along the rows and columns of the matrix formed by the detection cells and where the connecting lines are connected to the input and output terminals by controllable switches.

Foreign objects are detected by applying a stimulation signal provided by the stimulation unit to a selected detection cell, measuring the resulting response and, comparing the resulting response to a response of that detection cell to the same stimulation signal that has previously been recorded ensuring that no foreign object is positioned in the magnetic field, and if the resulting response is different from the previously recorded response, concluding that a foreign object is present in the magnetic field.

The stimulation signal may for example be a current step. The resulting step response caused by this current step is an oscillation of the voltage. This oscillation may be defined by several parameters, which thus may be influenced by a foreign object. A foreign object may for example change the inductance L and the resistance R of a sense coil.

The stimulation signal may also be a rectangular pulse or any other signal that allows to determine the property desired or needed for the detection of a foreign object.

If the area to be covered by the foreign object detection is large, a single coil usually is not sufficient to cover the whole area. As shown for example in EP 3 734 801, this problem is solved by using a multitude of detection cells arranged in a matrix-like structure.

Still, the sense coil of each of these multiple detection cells has not the same sensitivity across the whole surface that this particular sense coil covers. For example, a sense coil having a generally square shape with an even distribution of the turns such as for example shown in FIG. 8a and FIG. 8b of EP 3 734 801, the sensitivity of the sense coil reaches a maximum at the centre of the coil and drops almost linearly to the edges of the coil. Hence a foreign object positioned for example between the edges of two neighbouring sense coils may not be detected due to the reduced sensitivity of the sense coil in that area.

In another example, a sense coil having a generally square shape where the turns are concentrated in an outer region of the coil such as for example shown in FIG. 8c of EP 3 734 801, the sensitivity of the sense coil reaches a maximum at about half the distance between the centre of the coil and the edges of the coil, has a drop around the centre of the coil and also drops from the maximum almost linearly to the edge of the coil.

Hence a foreign object positioned for example in the centre of such a sense coil may not be detected due to the reduced sensitivity of the sense coil in its centre and it is difficult to interpret the signals indicating the detection of a foreign object which is why the system is typically designed for the worst case scenario and thus usually has to be oversized.

SUMMARY

Embodiments of the disclosure propose a sensor arrangement pertaining to the technical field initially mentioned. The embodiments of the disclosure also propose a corresponding foreign object detection device and a corresponding primary part for a wireless power transfer system for transferring power over an air gap to a nearby receiver.

According to an embodiment of the disclosure, the sensor arrangement includes a current input and a current output, a multitude of detection cells, a multitude of input leads and one or more output leads, and an input selection circuit. Each detection cell includes a sense coil including a winding spirally wound in a plane and having a multitude of turns. Each detection cell is connected between one of the input leads and one output lead, and each detection cell is connected to a different combination of input and output leads. The input selection circuit adapted to selectively establish an electrical connection between the current input and one or more of the input leads. The sense coil of at least one detection cell includes an outer coil section and an inner coil section arranged inside the outer coil section, where a first distance between an outermost turn of the inner coil section and an innermost turn of the outer coil section is at least twice a largest distance between two turns of the outer coil section.

According to the embodiments of the disclosure, a foreign object detection device is provided, which includes a sensor arrangement as described above, a stimulus circuit for generating a predetermined stimulation signal, connected to a current input of the sensor arrangement, a measurement unit adapted to sense an electrical signal applied to said current input and including an analogue to digital converter for acquiring sampling data representing the sensed electrical signal and a signal processing unit configured to determine time response data of a selected detection cell based on the sampling data acquired by the measurement unit.

According to the embodiments of the disclosure, a primary part for a wireless power transfer system for transferring power over an air gap to a nearby receiver is provided, the primary part is configured to generate a magnetic field in an active area at a transmission frequency, the primary part including a sensor arrangement as described above or a foreign object detection device as described above, where the sense coils are arranged in a way that a sensing area defined by the sense coils at least partly covers the active area.

BRIEF DESCRIPTION OF DRAWINGS

The drawings used to explain the embodiments.

FIG. 4 is a schematic representation of the effect of a foreign object in dependency of the position of the foreign object for the coil shown in FIG. 1a.

FIG. 5 is a schematic representation of the effect of a foreign object in dependency of the position of the foreign object for the coil shown in FIG. 2a.

FIG. 6 is a schematic representation of the effect of a foreign object in dependency of the position of the foreign object for the coil shown in FIG. 3a.

In the figures, the same components are given the same reference symbols.

DESCRIPTION OF EMBODIMENTS

Figure 1A:
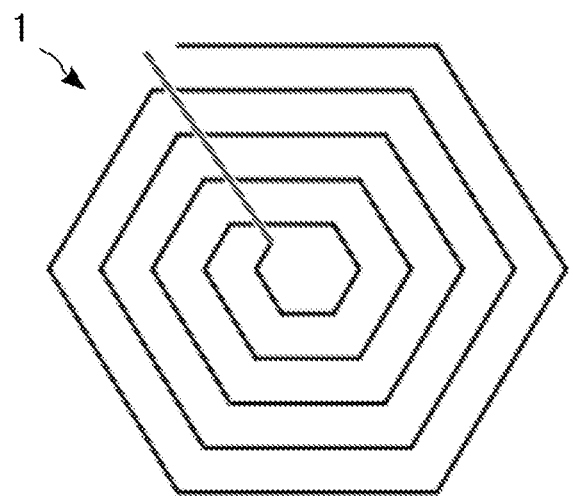
FIG. 1a and FIG. 1B are a schematic representation of a hexagonal sense coil with linear turn distribution according to the prior art with resulting magnet field magnitude.

According to the embodiments of the disclosure, a sensor arrangement for a foreign object detection device for a wireless power transfer system is provided. The sensor arrangement includes a current input and a current output, a multitude of detection cells, a multitude of input leads and one or more output leads, and an input selection circuit. Each detection cell includes a sense coil including a winding spirally wound in a plane and having a multitude of turns. Each detection cell is connected between one of the input leads and one output lead, and each detection cell is connected to a different combination of input and output leads. The input selection circuit adapted to selectively establish an electrical connection between the current input and one or more of the input leads. The sense coil of at least one detection cell includes an outer coil section and an inner coil section arranged inside the outer coil section, where a first distance between an outermost turn of the inner coil section and an innermost turn of the outer coil section is at least twice a largest distance between two turns of the outer coil section. With such sensor arrangement, a more uniform sensitivity for the detection of foreign objects across the surface of the transmitting unit is ensured.

In an implementation, the sense coil of all detection cells includes an outer coil section and an inner coil section arranged inside the outer coil section, where a first distance between an outermost turn of the inner coil section and an innermost turn of the outer coil section is at least three times a largest distance between two turns of the outer coil section.

By dividing the turns of the sense coil in an outer and an inner coil section where the inner and the outer coil section are spaced apart, the sensitivity of the sense coil can be made more uniform around the centre of the sense coil. The outer coil section thereby corresponds to a concentration of the windings in the outer region where the inner coil section ensures that there is no or no substantial drop in sensitivity around the centre of the sense coil.

Accordingly, the embodiments of the disclosure not only ensure a more uniform sensitivity for the detection of foreign objects of a single sense coil but therewith also across the surface of the transmitting unit.

In addition to the sensor arrangement, an FOD device according to the embodiments of the disclosure further includes a stimulus circuit for generating a predetermined stimulation signal such as for example a current step or a current pulse. The stimulation signal may also be a sinusoidal signal. The stimulus circuit is connected to a current input of the sensor arrangement. Accordingly, the current input is a connection point of the sensor arrangement where the current of the stimulation signal flows into the sensor arrangement. Similarly, the current output is a connection point of the sensor arrangement where the current of the stimulation signal flows out of the sensor arrangement. Often, the current output is connected to ground.

An input lead is an electrical connection connecting a detection cell to an input selection circuit as described further below, where the input selection circuit then establishes the electrical connection between the current input and one or more input leads. Similarly, an output lead is an electrical connection connecting a detection cell either directly to the current output of the sensor arrangement or to an output selection circuit as described further below, where the output selection circuit then establishes the electrical connection between one or more output leads and the current output. The input and output leads may be formed by any suitable electrical conductor such as for example a wire. Usually, the input leads are however formed by traces on a PCB.

The FOD device further includes a measurement unit, adapted to sense an electrical signal applied to the current input, where the measurement unit includes an analogue to digital converter for acquiring sampling data representing the sensed electrical signal. The FOD device also includes a signal-processing unit, which is configured to determine time response data of a selected detection cell, based on sampling data acquired by the measurement unit. In an implementation, the measurement unit includes a filter for filtering the electrical signal.

The sense coils are for example arranged as a flat structure such as a mat or plate that is positioned above the primary pad for the generation of the power transfer field and such that it is arranged between the primary and the secondary pad when the device including the secondary pad is positioned to receive power through the power transfer field.

In the context of this disclosure, a wireless power transfer system is a system that allows power transfer without wires as a physical link across a space via a time-varying electromagnetic field. The power transfer system includes a primary part as transmitter device, driven by electric power from a power source, which generates the electromagnetic field, and a secondary part as a receiver device, which extracts power from the field and supplies it to an electrical load. In a particular form, the wireless power transfer system is an inductive power transfer system.

The electromagnetic field, which is also referred to as power transfer field, is generated by at least one resonator arranged in the primary part of the power transfer system. The shape of the power transfer field depends on the elements of the resonator and how they are arranged and interconnected. Such a resonator usually includes a resonating circuit with at least one coil and a capacitor. The resonator may also include other elements such as for example an additional inductor and one or more flux guiding elements. A so-called double D arrangement is often used in a resonator to generate the power transfer field. Such an arrangement includes two D-shaped (or similar) coils arranged next to each other and above a ferrite sheet or the like. When a current is fed through both coils in opposite direction, a magnetic field is generated where the field lines run through the centers of the coils but run generally parallel to the plane of the coils in the area between the coils. If a secondary part is located within the proximity, e.g. above, the primary part, the field lines of the primary field are deformed by the secondary part. The form of the resulting power transfer field is strongly dependent on the arrangement of the secondary part in respect to the primary part and also from the currents in the primary and the secondary windings and therewith from the transferred power.

In the context of this disclosure, a foreign object is defined as any electrical conductive and/or a magnetic object, in particular any metallic object that is positioned in proximity to a wireless power transfer system, but which is not part of it and which might generate losses in the power transfer of the power transfer system.

The term "active area" is used for the area through which a major portion of the magnetic flux lines of the primary field would extend when the primary part is powered with its nominal current and frequency, in the absence of the secondary part and foreign objects. A major portion can be for instance 10%, 25%, 50%, 75%, 80%, 90%, 95% or 99% of the total magnetic flux. The active area defines a region in which proximity a secondary has to be placed to transfer power. For wireless charging applications the active area may also be designated as "charging area".

In a similar way the term "power transfer area" is used for the area through which a major portion of the magnetic flux lines of the primary field would extend for the case when a secondary part is arranged in its nominal position but when no power is transferred through the air gap between the primary part and the secondary part. In other words, the active area and the power transfer area define surfaces in the space close to the primary part, which are exposed to the magnetic field of the primary part.

In the context of the disclosure, the term "time response data of a selected detection cell" is understood to include a set of data representing the time response of a selected detection cell due to a predefined stimulation signal, where the time response data is obtained based on sampling data of the electrical signal representing the excited oscillation of a selected detection cell.

This data may simply include raw sampling data of the electrical signal representing the excited oscillation due to the predetermined stimulation signal, acquired by means of the analogue to digital converter of the FOD device for a selected detection cell. The data may also include values obtained after applying digital processing steps to the raw sampling data, such as downsampling, upsampling, scaling, filtering, data compression, applying correlation functions, parameter identification etc. This list is not exclusive. The time response data of a selected detection cell may in particular include a single parameter, such as the serial resistance, the serial inductivity or more generally, the serial impedance of a detection cell, a relative change of the serial impedance of a selected detection cell, a decay rate, a change in a decay rate, a resonant frequency or a change in the resonant frequency. The time response data may also include a combination of such parameters.

Generally, the inner coil section and the outer coil section may both have any number of turns. The number of turns of both sections may be chosen to best suit a particular application, including the particular number and arrangement of detections cells and the particular shape of the sense coils.

In an embodiment of the disclosure, the sense coil however includes a multitude of turns in the outer coil section and a single turn in the inner coil section. Experiments have shown that a single turn of the inner coil section is sufficient in many cases to achieve a sufficiently uniform distribution of the sensitivity of the sense coil.

In the case of a single turn of the inner coil section, in an implementation, the first distance is equal to a distance of the single turn in the inner coil section and a centre of the sense coil of the at least one detection cell. Or in other words, the distance between that single turn and the centre of the sense coil is the same as the distance between that single turn and the innermost turn of the outer coil section. Experiments have shown that this position of the single turn of the inner coil section results in a sufficiently uniform distribution of the sensitivity of the sense coil.

In another embodiment of the disclosure, the distance between the centre of the sense coil of the at least one detection cell and an innermost turn of the inner coil section is smaller than two thirds of the distance between the centre of the sense coil and the outermost turn of the outer coil section. Accordingly, the turns of the outer coil section are concentrated in the outer region of the sense coil whereas the turns of the inner coil section are arranged within the outer coil section but spaced apart therefrom.

In an embodiment of the disclosure, the distance between the centre of the sense coil of the at least one detection cell and the innermost turn of the inner coil section is smaller than a half of the distance between the centre of the sense coil and the outermost turn of the outer coil section.

Although the turns of the outer coil section may be chosen to have different distances to each other, in an implementation, they are chosen such that they are arranged equally distant to each other.

Similarly, if the inner coil section includes three or more turns, these turns may be chosen to have different distances to each other. In an implementation, they are chosen such that they are arranged equally distant to each other too.

Thereby, the equal distance of the turns of the outer coil section and the equal distance of the turns of the inner coil section may be different, or they may be the same.

In an implementation, the planes in which the sense coils of the detection cells are wound are at least parallel to each other. In an implementation, the planes in which the sense coils of the detection cells are wound are arranged in a single layer.

In an implementation, the sense coils of such a single layer do not overlap each other. In dependence of the outer shape of the sense coils and the position of the centres of the sense coils, there may exist interspaces between the sense coils, where the detection sensitivity may be decreased or where even no detection is possible, yielding blind spots.

The sense coils may however also be arranged in more than one layer where these layers are arranged parallel to each other.

In this case, the sense coils of different layers are arranged in a way that the sense coils of one layer, overlap the sense coils of another layer such that blind spots or interspaces with decreased detection sensitivity of one layer are covered by the sense coils of another layer. Accordingly, blind spots or areas with a decreased detection sensitivity can be avoided. This increases the coverage of the total detection area and may provide a higher and a more uniform detection sensitivity.

Accordingly, in another embodiment of the disclosure, the sense coils are arranged in one or more layers.

In order to further increase the uniformity of the detection sensitivity, in an implementation, the sense coils of each layer are arranged in a regular pattern. In order to achieve a most uniform sensitivity possible, the sense coils of each layer are arranged in the same regular pattern but offset to each other such that that blind spots or interspaces with decreased detection sensitivity of one layer are covered by the sense coils of another layer in the best possible way.

In an embodiment of the disclosure, the regular pattern is a matrix-like structure. Accordingly, the sense coils of a layer are arranged in a matrix-like structure with multiple rows and multiple columns. The term matrix usually implies that the individual elements of the matrix are precisely arranged next to and among each other.

In contrast, the term matrix-like in the context of this disclosure is intended to mean that the individual elements of the matrix are arranged next to and among each other but that they do not have to be arranged precisely next to and among each other. For example, an arrangement where the individual of detection cells of a column or row are slightly offset to each other, such as in a honeycomb arrangement, is to be regarded as a matrix-like structure in the context of this disclosure too, independent of the shape of the sense coils of the detection cells.

By arranging the sense coils in a single layer, a large total detection area can be covered by the sensor arrangement with a minimum number of sense coils. In addition, a flat structure can be realized. The sense coils can for instance be arranged on a flat support structure, such as a plate made of non-electrical material, a single PCB or on a flexible foil e.g. by vapor deposition.

The sense coils may also be installed in recessions of a support structure.

The term flat support structure in the context of this disclosure designates a flat structure such as a coil mat or plate, where flat means, that the thickness of the mat respectively the plate is smaller than a fifth of its largest lateral extension.

In an embodiment, the support structure is a multi-layer PCB and the sense coil layers are realized by traces belonging to different layers of the PCB.

Whereas the sense coils of the detection cells necessarily have to be arranged on the flat structure, other elements of the detection cells may or may not be positioned on the flat structure. For example, the capacitor that forms the resonant tank together with the sense coil as well as the decoupling element may be arranged outside of the flat structure, for example on a control board connected to the flat structure.

In another aspect of the disclosure, the sense coils are arranged in one or more layers and the sense coils of a particular layer are arranged in a matrix-like structure with multiple rows and multiple columns.

In a first example of this aspect of the disclosure, the sensor arrangement includes an input selection circuit as well as an output selection circuit. The input lead of a particular detection cell is routed from the input selection circuit to the sense coil of that detection cell and the output lead of that detection cell is routed from the sense coil of that detection cell to the output selection circuit.

A particular detection cell may be connected to a stimulation unit and to a measurement unit by means of an input multiplexer and an output multiplexer respectively using connecting lines that are fed along the rows and columns of the matrix formed by the detection cells and where the connecting lines are connected to the input and output terminals by controllable switches.

Another possibility for routing the input and output leads to the detection cells is to provide a separate connection from the input selection circuit to each detection cell and to provide a separate connection from each detection cell to the output selection circuit.

However, according to this first example of this aspect of the disclosure, each input lead of a particular layer interconnects all detection cells of a particular row of the matrix-like structure and each output lead of that particular layer interconnects all detection cells of a particular column of the matrix-like structure or each input lead of a particular layer interconnects all detection cells of a particular column of the matrix-like structure and each output lead of that particular layer interconnects all detection cells of a particular row of the matrix-like structure.

In this way, the total number of input and output leads is smaller than the number of detection cells as soon as the number of detection cells is equal to or larger than six. Accordingly, the number of detection cells of the sensor arrangement is 6 or higher. This embodiment is therefore suited for sensor arrangements with a comparably high number of detection cells such as for example more than 50 detection cells. It may however also be used for sensor arrangements with less than 50 detection cells.

Hence, as outlined above, each detection cell may be connected to a different combination or pair of input and output leads.

It is to note that this aspect of the disclosure may be applied to a sensor arrangement for the detection of foreign objects independently of the other features of the sensor arrangement described above such as for example the distribution of the turns of the sense coils. Also, the embodiments of the routing of the input and output leads as described below may be applied to a sensor arrangement for the detection of foreign objects independently of the other features of the sensor arrangement described above.

By routing the input and output leads of a particular layer in this way, the number of outputs of the input selection circuit and the number of inputs of the output selection circuit may be minimized. Further, the total length of the input and output leads may be reduced as certain parts of the leads can be used to connect multiple detection cells.

With the routing of the input and output leads of the detection cells, the hardware effort and the total length of the input and output leads are minimized.

In a second example of this aspect of the disclosure, the sensor arrangement includes an input selection circuit but no output selection circuit. An output selection circuit is not necessary because the sensor arrangement does only include a single output lead that interconnects all detection cells and directly connects them to the current output. In this example, each detection cell includes its own input lead. Accordingly, the input lead of a particular detection cell is routed from the input selection circuit to the sense coil of that detection cell. A particular detection cell may be connected to the stimulation unit and to the measurement unit by means of an input multiplexer where the connecting lines are fed from the input multiplexer to the detection cells along the rows and columns of the matrix formed by the detection cells. The input multiplexer for example includes a number of controllable switches that are controlled such as to connect one or more of the detection cells to the current input.

In this way, the total number of input and output leads is higher than the number of detection cells, namely the total number of input and output leads is equal to the number of detection cells plus one. This embodiment is therefore suited for sensor arrangements with a comparably low number of detection cells such as for example less than 200 detection cells. It may however also be used for sensor arrangements with more than 200 detection cells.

Furthermore, the input and output lead of a detection cell form a loop. If this loop is exposed to a magnetic field such as for example the magnetic field generated by the wireless power transfer system for the wireless power transfer, and in a way that the field lines of the magnetic field may flow through the area spanned by the loop, a voltage is induced at the terminals of the loop. Such an induced voltage may disturb the impedance measurement or distort the response of the detection cell to the stimulation signal or to a foreign object positioned in the vicinity of that detection cell. The distortion may be small enough to be ignored but it may also be so large that it makes a reliable measurement impossible.

In another aspect of the disclosure, the input lead and the output lead of at least one sense coil are therefore routed through the matrix-like structure to which the at least one sense coil belongs close to each other such as to reduce an area spanned by said input and output leads.

By routing the input and output leads of the sense coil of a particular detection cell such as to reduce the area spanned by the input and output leads, the voltage induced by an external magnetic field may be reduced or minimized. This accordingly minimizes interference effects and distortions in the detection of foreign objects by an external magnetic field such as the magnetic field for the energy transfer of the wireless power transfer system.

In an implementation, the input lead and the output lead of each sense coil of the sensor arrangement is routed through the matrix-like structure in this way.

In this way, the area enclosed by the input and output leads and flowed through by the power transfer field can be significantly reduced.

Accordingly, in order to reduce the area through which the magnetic field lines may flow, the area spanned by the input and output leads should be aligned as parallel as possible to the field lines. So, depending on the course of the field lines of the power transfer field in the region where the input and output leads are arranged, the input and output leads should be routed such that the area spanned therebetween is parallel to the field lines.

In an embodiment where the field lines of the magnetic field run perpendicular to the matrix-like structure, the input and output leads are arranged one above the other. And in an embodiment where the field lines of the magnetic field run parallel to the matrix-like structure, the input and output leads are arranged in the same plane parallel to the matrix-like structure.

For example, in a double D arrangement as mentioned above, the field lines in the region between the two coils run generally parallel to the sense coils. So, by arranging the sensor arrangement such that the input and output leads are positioned above the region between the coils, the field lines of the power transfer field run parallel to the plane of the matrix-like structure. Hence the area spanned by the input and output leads of the detection cells is parallel to the field lines of the power transfer field, i.e. the area where the field lines of the power transfer field can flow through, is minimized.

Or more generally, the routing of the input and output leads through the matrix-like structure is generally chosen and the matrix-like structure generally arranged such that the input and output leads are positioned in a region where the field lines of the power transfer field run parallel to the plane of the matrix-like structure. In such a region, the field lines are also less densely distributed and the field strength is therefore weaker. This reduces the voltages induced in the loops formed by the input and output leads of the detection cells. How exactly the input and output leads are to be arranged on the matrix-like structure and how the matrix-like structure is to be arranged above the resonator that generates the power transfer field, strongly depends on the particular application and has to be chosen accordingly.

In addition, by reducing these induced voltages, the noise in the system may be reduced as well. Lower noise means less effort to analyze the measured responses of the detection cells to the stimulation signal in order to detect the presence of a foreign object. This results in lower manufacturing costs of a foreign object detection device according to the embodiments of the disclosure.

The embodiments of the disclosure accordingly reduce interference effects and distortions in the detection of foreign objects thereby also reducing the manufacturing costs of the foreign object detection device.

The input and output leads of each sense coil of a particular layer may be routed together along an edge of the matrix-like structure where the input and output leads of a particular row or column are routed into the matrix-like structure through a gap between the corresponding rows or columns.

In another embodiment of the disclosure, the input leads and the output leads of each sense coil of a particular layer are however commonly routed through a same gap between two columns or two rows of the matrix-like structure.

This routing results in an arrangement where all input and output leads of a particular layer are arranged close to each other, thereby not only reducing the total length of the leads but also the area enclosed by the loop of input and output lead of each detection cell and therewith also the voltage induced in each of these loops.

In an embodiment of the disclosure, the input leads and the output leads of each sense coil of a particular layer are routed through a gap between two central columns or two central rows of the matrix-like structure such as to minimize the total length of the input and output leads.

The term central in this connection means that in the case of an even number of rows or columns, the leads are routed through the gap between the two middle rows or columns and in the case of an uneven number of rows or columns, the leads are routed through one of the gaps near the middle row or column.

In another embodiment of the disclosure, the distance between the input lead and the output lead of the at least one sense coil is smaller than a distance between two rows or two columns of the matrix-like structure. So, both the input and output leads are routed in a small spatial area from the input selection circuit to the sense coils and from the sense coils to the output selection circuit respectively. In an implementation, this distance is below a third of the distance between two rows or two columns.

In another embodiment of the disclosure, the input lead and the output lead of at least one sense coil are arranged one above the other. This means that the input and the output lead of that sense coil are not arranged in the same plane but are arranged in different planes that are parallel to each other and parallel to the layer to which that sense coil belongs.

For example, the input lead may be arranged in a first layer of a multi-layer PCB and the output lead may be arranged in a second layer of the multi-layer PCB.

The input and output lead of a detection cell may be routed in parallel along their entire length. However, in an embodiment the input lead and the output lead of a detection cell are twisted at least once.

Due to such a twisting of the leads, the loop formed by the leads includes areas where the voltages induced by an external magnetic field cancel or reduce each other. This also leads to a lower induced voltage in these loops.

In a further embodiment, the sensor arrangement not only includes an input selection circuit, but also an output selection circuit that is adapted to selectively establish an electrical connection between one or more of the output leads and the current output.

In this way, the total number of input and output leads may be reduced to a number that is smaller than the number of detection cells as soon as the number of detection cells is equal to or larger than six.

The sense coils may generally have any suitable shape such as an oval, a circular, a hexagonal, any polygonal or any other suitable shape, where the shape may either be a regular or an irregular shape.

In another embodiment of the disclosure, the sense coil of the at least one detection cell has a rectangular shape, or a square shape. Rectangular or square in this context does not exclude that the corners of one or more turns of the coil are rounded.

Coils having a hexagonal shape, particularly a regular hexagonal shape, make the best use of the space available in a particular layer, so that the areas with reduced detection sensitivity between the coils can be reduced or even minimized. However, the input and output leads must then be routed in a zigzag between the cells, which leads to longer input and output leads and probably makes routing more difficult.

Rectangular or square coils also make a good use of the available space and allow for a straight routing of the leads between the detection cells and accordingly are a good compromise.

In another embodiment of the disclosure, each detection cell includes a capacitive element, forming a resonant tank together with the sense coil.

And in a further embodiment of the disclosure, at least one detection cell includes a decoupling element connected in series to its resonant tank where the decoupling element is a diode.

According to the embodiments of the disclosure, a foreign object detection device is provided, which includes a sensor arrangement as described above, a stimulus circuit for generating a predetermined stimulation signal, connected to a current input of the sensor arrangement, a measurement unit adapted to sense an electrical signal applied to said current input and including an analogue to digital converter for acquiring sampling data representing the sensed electrical signal and a signal processing unit configured to determine time response data of a selected detection cell based on the sampling data acquired by the measurement unit.

In an implementation, the measurement unit includes a filter for filtering the electrical signal, for example to remove disturbing or interfering components of the signal or to prepare the signal for an easier analysis.

According to the embodiments of the disclosure, a primary part for a wireless power transfer system for transferring power over an air gap to a nearby receiver is provided, the primary part is configured to generate a magnetic field in an active area at a transmission frequency, the primary part including a sensor arrangement as described above or a foreign object detection device as described above, where the sense coils are arranged in a way that a sensing area defined by the sense coils at least partly covers the active area. In an implementation, the sensing area entirely covers the active area.

Other advantageous embodiments and combinations of features come out from the detailed description below and the entirety of the claims.

Figure 1B:
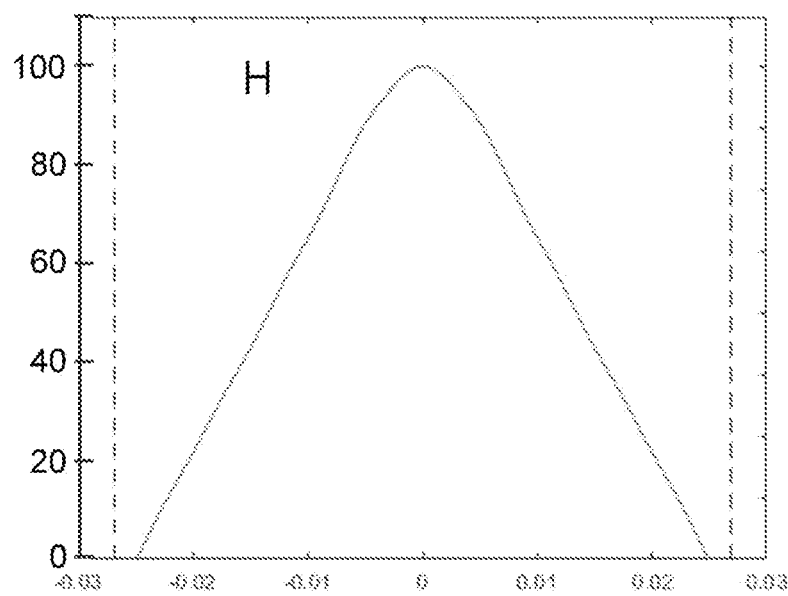

FIG. 1a shows a hexagonal sense coil 1 with a linear turn distribution as known in the prior art. The sense coil 1 has a length of about 56 mm and a width of about 50 mm with a distance between adjacent turns of the coil of about 5 mm. FIG. 1b shows a qualitative illustration of the corresponding summed magnet field magnitude resulting from that hexagonal sense coil 1 for example when a stimulation signal including a step is applied. The horizontal axis shows the distance from centre of the sense coil 1 in m and the vertical axis shows the magnetic field strength in percent of the respective maximum value. The resulting absolute values of the magnetic field strength depend on various parameters of the particular application.

As can be seen the magnetic field strength H has its maximum at the centre of the sense coil 1 and drops to 0 towards the edge of the sense coil 1. Accordingly, the magnetic field strength of such a sense coil 1 is far from uniform across the area covered by the sense coil 1.

Figure 2A:
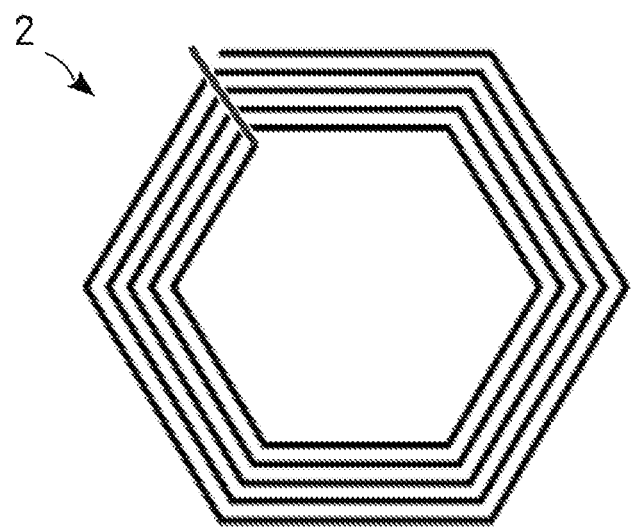
FIG. 2a and FIG. 2b are a schematic representation of a hexagonal sense coil with turn concentration in an outer region of the coil according to the prior art with resulting magnet field magnitude.
Figure 2B:
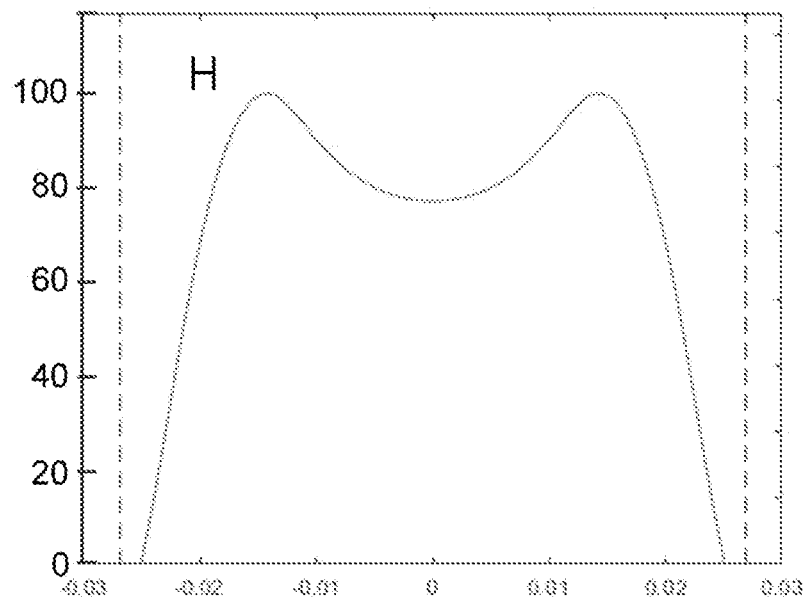

FIG. 2a shows a hexagonal sense coil 2 with a turn concentration in an outer region of the sense coil 2. The sense coil 2 again has a length of about 56 mm and a width of about 50 mm and includes 5 turns in the outer region of the sense coil 2 with a distance between adjacent turns of about 2 mm. FIG. 2b shows a qualitative illustration of the resulting magnetic field strength. Again, the horizontal axis shows the distance from centre of the sense coil 2 in m and the vertical axis shows the magnetic field strength H in percent of the respective maximum value.

As can be seen, the magnetic field strength H has its maximum at a distance of about 15 mm from the centre of the sense coil 2, drops to 0 towards the edge of the sense coil 2 and also drops to a minimum of about 80% towards the centre of the sense coil 2. Again, the magnetic field strength of such a sense coil 2 may not be designated as uniform across the area covered by the sense coil 2.

Figure 3A:
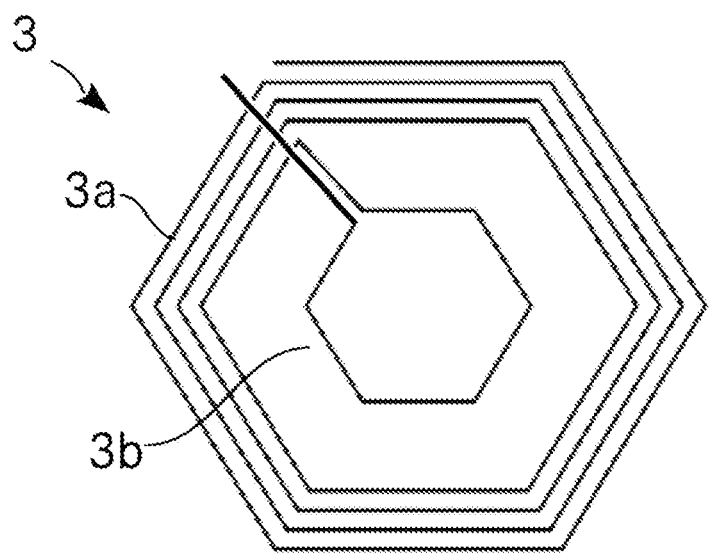
FIG. 3a and FIG. 3b are a schematic representation of a hexagonal sense coil according to an embodiment of the disclosure with resulting magnet field magnitude.

FIG. 3a shows a hexagonal sense coil 3 according to the embodiments of the disclosure. The sense coil 3 again has a length of about 56 mm and a width of about 50 mm and includes an outer coil section 3a with a multitude of turns. In this example the outer coil section 3a includes 4 turns with a distance between adjacent turns of about 2 mm, and an inner coil section 3b with a single turn.

Figure 3B:
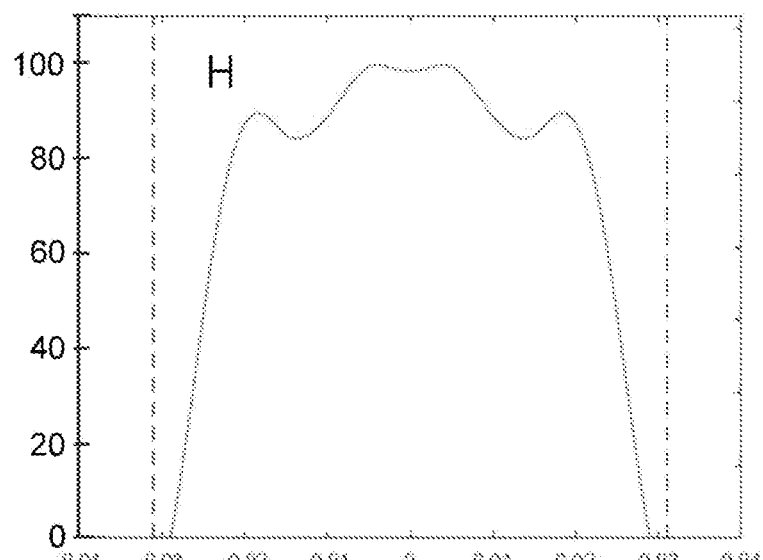

FIG. 3b shows a qualitative illustration of the resulting magnetic field strength. Again, the horizontal axis shows the distance from centre of the sense coil 3 in m and the vertical axis shows the magnetic field strength H in percent of the respective maximum value.

As can be seen, the magnetic field strength H has its maximum in a region around the centre of the sense coil 3 with a radius of about 4 mm. From there, it slightly drops to a local minimum of about 85% at a distance of about 13 mm, rises again to a local maximum of about 90% at a distance of about 20 mm from the centre of the sense coil 3, and then drops to 0 towards to edge of the sense coil 3.

Hence, the resulting magnetic field strength is much more uniform. In an area around the centre of the sense coil 3 having a radius of about 22 mm the magnetic field strength varies only slightly before it drops steeply towards the edge of the sense coil 3.

The absolute values of the resulting magnet field strength when measuring the resulting response of a detection cell to the stimulation signal also strongly depend on the foreign object that is present in the magnetic field. For example, the foreign object that has been used to measure the resulting field strength in the examples shown in FIGS. 1-3 was a square copper plate with a side length of 20 mm and a thickness of 0.3 mm.

In another example (not shown), the sense coil has a hexagonal shape, four turns in the outer coil section and a single turn in the inner coil section and therefore looks exactly like the sense coil 3 shown in FIG. 3a. However, the dimensions are different. In this case, the sense coil is a bit larger which is for example better suited to cover a larger active area of the primary field and/or to detect larger foreign objects. The width between two parallel sides (the smaller side length of the rectangle enclosing the hexagon) is about 76.5 mm which results in a length of about 88.5 mm (the larger side length of the rectangle enclosing the hexagon). The four turns in the outer coil section have a distance of about 3 mm to each other and the single turn in the inner coil section has a width of about 30 mm (the smaller side length of the rectangle enclosing the hexagonal single turn) and a length of about 35.5 mm (the larger side length of the rectangle enclosing the hexagonal single turn). Accordingly, the distance between the single turn of the inner coil section and the innermost turn of the outer coil section is about 13 mm which is more than four times the distance of 3 mm between two turns of the outer coil section.

Figure 4:
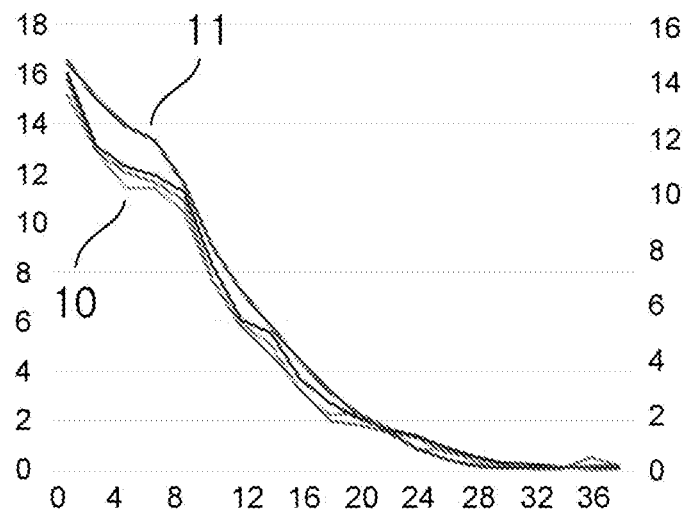

FIG. 4 shows a schematic representation of the effect of a foreign object in dependency of the position of the foreign object for the sense coil 1 shown in FIG. 1a.

FIG. 4 shows the change in the resistance R and the inductance L of the sense coil 1 for a standardized object (an aluminum ring) in dependency of the displacement of that object from the centre of the sense coil 1. The horizontal axis shows the displacement from centre of the sense coil 1 in mm, the vertical axis on the left shows the change of the resistance R in percent and the vertical axis on the right shows the change of the inductance L in percent.

The group 10 of lines shows the change of the resistance R of the sense coil 1 for the three frequencies 800 kHz, 850 kHz and 900 kHz. As can be seen, the change of the resistance R of the sense coil 1 is about 16% if the standardized object is positioned in the centre of the sense coil 1, then the change of the resistance R decreases to a value of about 2% at a displacement of about 18 mm from the centre. Then the change in resistance R decreases further and approaches zero at a distance of 28 mm or more.

The group 11 of lines shows the change of the inductance L of the sense coil 1 for the same three frequencies 800 kHz, 850 kHz and 900 kHz. As can be seen, the three lines are almost identical over the whole range of displacements from the centre of the coil 1. The change of the inductance L of the sense coil 1 is about 15% if the standardized object is positioned in the centre of the sense coil 1, then the change of the inductance L decreases to a value of about 2% at a displacement of about 20 mm from the centre. Then the change in inductance L decreases further and approaches zero at a distance of 28 mm or more.

Figure 5:
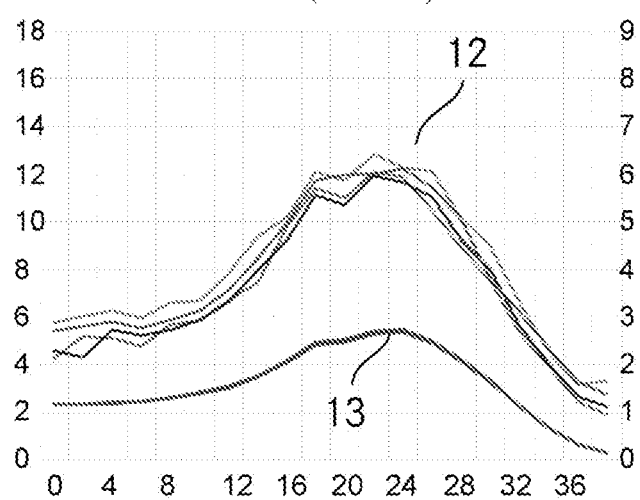

FIG. 5 shows a schematic representation of the effect of a foreign object in dependency of the position of the foreign object for the sense coil 2 shown in FIG. 2a.

FIG. 5 shows the change in the resistance R and the inductance L of the sense coil 2 for a standardized object (an aluminum ring) in dependency of the displacement of that object from the centre of the sense coil 2 similar to FIG. 4. The horizontal axis shows the displacement from centre of the sense coil 2 in mm, the vertical axis on the left shows the change of the resistance R in percent and the vertical axis on the right shows the change of the inductance L in percent.

The group 12 of lines shows the change of the resistance R of the sense coil 2 for the three frequencies 800 kHz, 850 kHz and 900 kHz. As can be seen, the change of the resistance R of the sense coil 2 is around 5% if the standardized object is positioned in the centre of the sense coil 2, then the change of the resistance R increases until it reaches a maximum at a displacement of about 22 mm, then rapidly decreases to a value of about 3% towards the edge of the sense coil 2.

The group 13 of lines shows the change of the inductance L of the sense coil 2 for the same three frequencies 800 kHz, 850 kHz and 900 kHz. As can be seen, the three lines are almost identical over the whole range of displacements from the centre of the coil 2. The change of the inductance L of the sense coil 2 is about 1% if the standardized object is positioned in the centre of the sense coil 2, then the change of the inductance L increases to a value of about 2.5% at a displacement of about 24 mm from the centre. Then the change in inductance L decreases again and approaches zero towards the edge of the sense coil 2.

Figure 6:
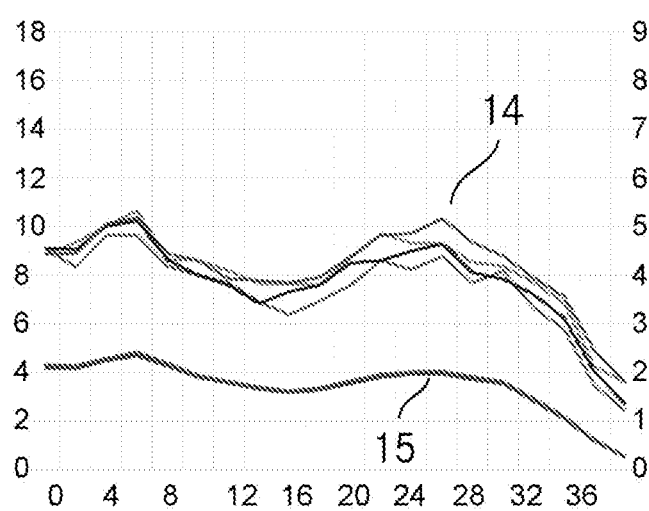

FIG. 6 shows the effect of a foreign object in dependency of the position of the foreign object for the coil shown in FIG. 3a.

FIG. 6 shows the change in the resistance R and the inductance L of the sense coil 3 according to the embodiments of the disclosure for a standardized object (an aluminum ring) in dependency of the displacement of that object from the centre of the sense coil 3 similar to FIG. 4 and FIG. 5. The horizontal axis shows the displacement from centre of the sense coil 3 in mm, the vertical axis on the left shows the change of the resistance R in percent and the vertical axis on the right shows the change of the inductance L in percent.

The group 14 of lines shows the change of the resistance R of the sense coil 3 for the three frequencies 800 kHz, 850 kHz and 900 kHz. As can be seen, the change of the resistance R of the sense coil 3 is around 9% if the standardized object is positioned in the centre of the sense coil 3, then slightly increases to a value of around 10% at a displacement of about 6 mm, then falls to a value of around 7% at a displacement of about 16 mm, rises again to a value between about 8% and 10% at a displacement of about 22 mm before it drops again to a value around 3% towards the edge of the sense coil 3.

The group 15 of lines shows the change of the inductance L of the sense coil 3 for the same three frequencies 800 kHz, 850 kHz and 900 kHz. As can be seen, the three lines are almost identical over the whole range of displacements from the centre of the coil 3. The change of the inductance L of the sense coil 3 is about 2% if the standardized object is positioned in the centre of the sense coil 3, then slightly increases to a value of about 2.5% at a displacement of about 6 mm, drops to a value of about 1.5% at a displacement of about 16 mm, rises again to a value of about 2% at a displacement of about 26 mm and finally drops to about 0% towards the edge of the sense coil 3.

As can be seen from FIG. 4 to FIG. 6, the change of the resistance R as well as the change of the inductance L of the sense coil 3 according to the embodiments of the disclosure is much more uniform as with the sense coils 1 and 2 as known in the prior art. The sense coil 3 according to the embodiments of the disclosure therefore shows a much more evenly distributed sensitivity when compared to the existing approaches.

Figure 7:
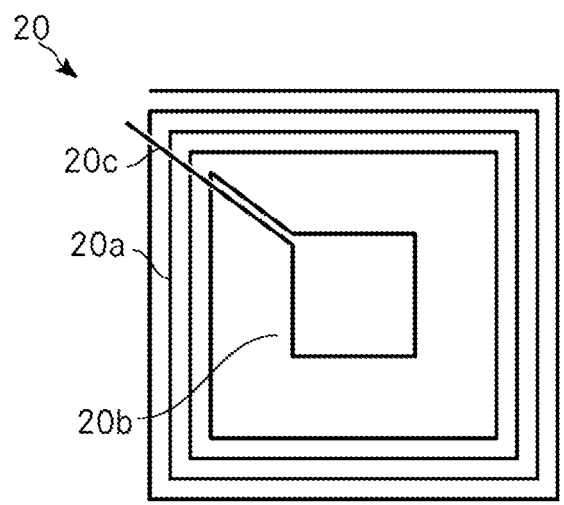
FIG. 7 is a schematic representation of a sense coil according to another embodiment of the disclosure.

FIG. 7 shows a sense coil 20 according to another embodiment of the disclosure. The sense coil 20 has a rectangular shape, includes an outer coil section 20a with four turns and an inner coil section 20b with a single turn. The outer coil section 20a and the inner coil section 20b are arranged on a coil layer. FIG. 7 also shows the output connection line 20c leading from the end of the single turn of the inner coil section 20b to the outside of the coil 20. In this case, the output connection line 20c is arranged on a layer that is different from the coil layer and arranged above the coil layer.

Figure 8:
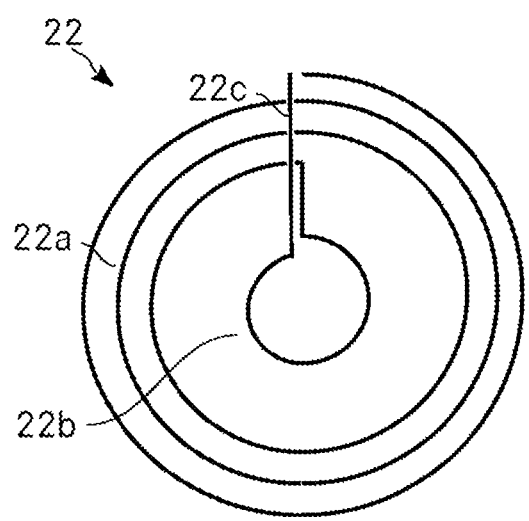
FIG. 8 is a schematic representation of a sense coil according to another embodiment of the disclosure.

FIG. 8 shows a sense coil 22 according to another embodiment of the disclosure. The sense coil 22 has a circular shape, includes an outer coil section 22a with three turns and an inner coil section 22b with a single turn. The outer coil section 22a and the inner coil section 22b are arranged on a coil layer. FIG. 8 also shows the output connection line 22c leading from the end of the single turn of the inner coil section 22b to the outside of the coil 22. Also in this case, the output connection line 22c is arranged on a layer that is different from the coil layer and arranged above the coil layer.

Figure 9:
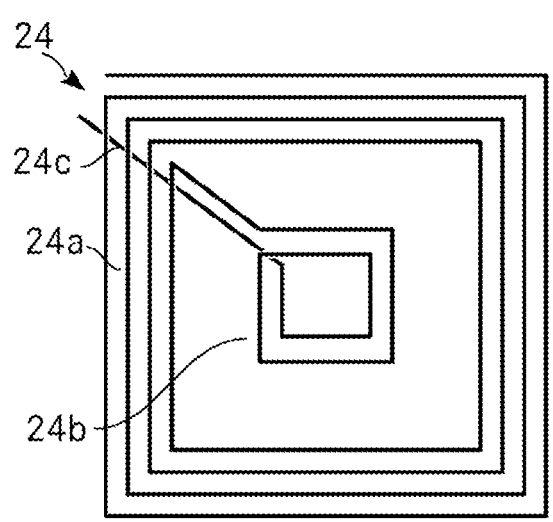
FIG. 9 is a schematic representation of a sense coil according to another embodiment of the disclosure.

And FIG. 9 shows a sense coil 24 according to a further embodiment of the disclosure. The sense coil 24 has a rectangular shape, includes an outer coil section 24a with four turns and an inner coil section 24b with two turns. The outer coil section 24a and the inner coil section 24b are arranged on a coil layer. FIG. 9 also shows the output connection line 24c leading from the end of the innermost turn of the inner coil section 24b to the outside of the coil 24. In this case, the output connection line 24c is arranged on a layer that is different from the coil layer and arranged below the coil layer.

Figure 10:
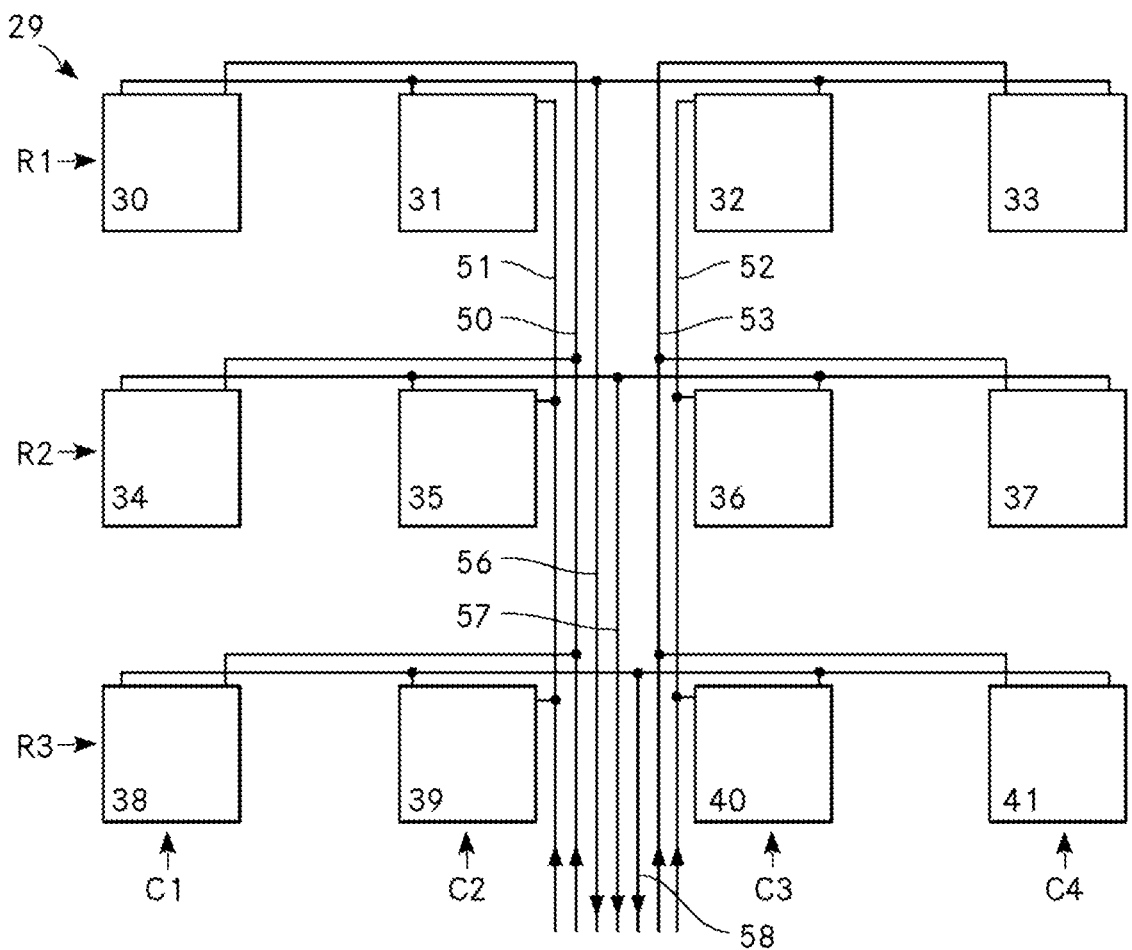
FIG. 10 is a schematic representation of sensor arrangement according to the embodiments of the disclosure.

FIG. 10 shows a sensor arrangement 29 according to the embodiments of the disclosure. The sensor arrangement 29 includes 12 detection cells 30-41 arranged in a matrix-like structure with three rows R1, R2 and R3 and four columns C1, C2, C3 and C4 where the first row R1 includes detection cells 30, 31, 32 and 33,
the second row R2 includes detection cells 34, 35, 36 and 37,
the third row R3 includes detection cells 38, 39, 40 and 41,
the first column C1 includes detection cells 30, 34 and 38,
the second column C2 includes detection cells 31, 35 and 39,
the third column C3 includes detection cells 32, 36 and 40, and
the fourth column C4 includes detection cells 33, 37 and 41.

Each detection cell includes any sense coil as described above or known in the art, particularly a sense coil according to the embodiments of the disclosure as described above.

The sensor arrangement 29 further includes a number of input leads 50, 51, 52 and 53. The input lead 50 enters the matrix-like structure between the two central columns C2 and C3 and interconnects the input terminal of all detection cells 30, 34 and 38 of the first column C1. The input lead 51 enters the matrix-like structure also between the two central columns C2 and C3 and interconnects the input terminal of all detection cells 31, 35 and 39 of the second column C2. The input lead 52 enters the matrix-like structure also between the two central columns C2 and C3 and interconnects the input terminal of all detection cells 32, 36 and 40 of the third column C3 and the input lead 53 enters the matrix-like structure also between the two central columns C2 and C3 and interconnects the input terminal of all detection cells 33, 37 and 41 of the fourth column C4.

The sensor arrangement 29 further includes a number of output leads 56, 57 and 58. The output lead 56 leaves the matrix-like structure between the two central columns C2 and C3 and interconnects the output terminal of all detection cells 30, 31, 32 and 33 of the first row R1. The output lead 57 leaves the matrix-like structure also between the two central columns C2 and C3 and interconnects the output terminal of all detection cells 34, 35, 36 and 37 of the second row R2 and the output lead 58 leaves the matrix-like structure also between the two central columns C2 and C3 and interconnects the output terminal of all detection cells 38, 39, 40 and 41 of the third row R3.

Accordingly, a particular detection cell may be activated by connecting the input lead of the column to which that detection cell belongs to the current input by means of the input selection circuit and by connecting the output lead of the row to which that detection cell belongs to the current output by means of the output selection circuit. For example, to activate detection cell 36, the input lead 52 is connected to the current input by means of the input selection circuit and the output lead 57 is connected to the current output by means of the output selection circuit.

Not shown in FIG. 10 are the current input and the current output of the sensor arrangement 29, the input selection circuit that interconnects the current input to one or more of the input leads 50, 51, 52 or 53 by means of controllable switches and the output selection circuit that interconnects one or more of the output leads 56, 57 or 58 to the current output by means of controllable switches.

It is to note that the arrangement, the sizes and the spacing of the different elements of the sensor arrangement 29 such as the detection cells, the input and output leads are not to scale. For example, the sizes of the detection cells are usually chosen so that as large a part as possible of the area of the sensor arrangement 29 is covered by the detection cells.

As shown in FIG. 10, all input leads 50, 51, 52 or 53 and all output leads 56, 57 or 58 are routed through the gap between the two central columns C2 and C3. And they are arranged such that the input and output leads of a particular detection cell are as close as possible arranged next to each other to minimise the area enclosed by the loop formed by the input and output lead of that detection cell.

Since all input and output leads are routed through the same gap between columns C2 and C3, the area enclosed by the loops formed by the input and output leads of the detection cells is as small as possible.

It is clear for one skilled in the art that the roles of the rows and columns of the sensor arrangement 29 may also be reversed.

Such a sensor arrangement 29 may for example be used in connection with a double D coil arrangement for generating the power transfer field as mentioned above. Such a coil arrangement generates a magnetic field having two poles, one in the centre of the first coil and one in the centre of the second coil. Then, for example, the sensor arrangement 29 is arranged above the coil arrangement such that the first column C1 of detection cells 30, 34 and 38 is positioned above the first pole of the power transfer field and such that the fourth column C4 of detection cells 33, 37 and 41 is positioned above the second pole of the power transfer field. In this way, the field lines of the power transfer field in the region between the second column C2 and the third column C3 generally run parallel to the planes of the detection cells. Accordingly, by arranging the input leads 50, 51, 52 and 53 and the output leads 56, 57 and 58 in the same layer parallel to the planes of the coils of the detection cells, the area perpendicular to the field lines spanned by the input and output leads of a detection cell is minimized. In addition, the field lines are also less densely distributed and the field strength is therefore weaker.

Figure 11:
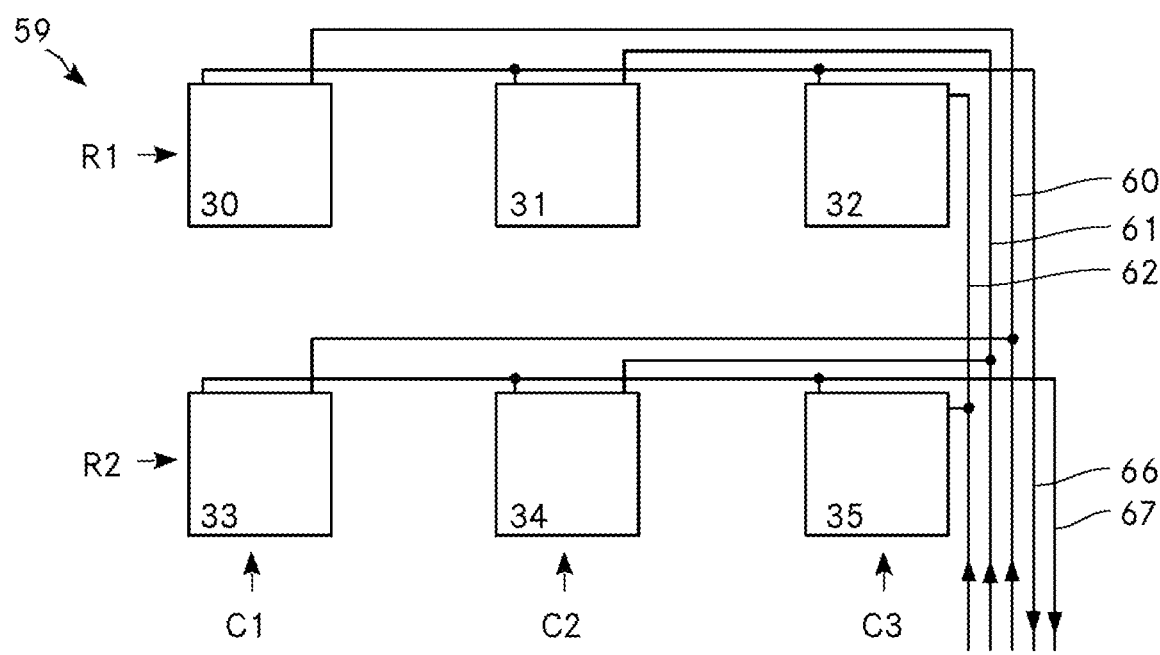
FIG. 11 is a schematic representation of another sensor arrangement according to the embodiments of the disclosure.

FIG. 11 shows a further sensor arrangement 59 according to the embodiments of the disclosure. The sensor arrangement 59 includes six detection cells 30-35 arranged in a matrix-like structure with two rows R1, R2 and three columns C1, C2, and C3 where the first row R1 includes detection cells 30, 31 and 32,
the second row R2 includes detection cells 33, 34 and 35,
the first column C1 includes detection cells 30 and 33,
the second column C2 includes detection cells 31 and 34, and
the third column C3 includes detection cells 32 and 35.

Each detection cell includes any sense coil as described above or known in the art, particularly a sense coil according to the embodiments of the disclosure as described above.

The sensor arrangement 59 further includes a number of input leads 60, 61 and 62. The input lead 60 enters the matrix-like structure at the edge of the sensor arrangement 59 near the third column C3 and interconnects the input terminal of all detection cells 30 and 33 of the first column C1. The input lead 61 enters the matrix-like structure also at the edge of the sensor arrangement 59 near the third column C3 and interconnects the input terminal of all detection cells 31 and 34 of the second column C2 and the input lead 62 enters the matrix-like structure also at the edge of the sensor arrangement 59 near the third column C3 and interconnects the input terminal of all detection cells 32 and 35 of the third column C3.

The sensor arrangement 59 further includes a number of output leads 66 and 67. The output lead 66 leaves the matrix-like structure at the edge of the sensor arrangement 59 near the third column C3 and interconnects the output terminal of all detection cells 30, 31 and 32 of the first row R1 and the output lead 67 leaves the matrix-like structure also at the edge of the sensor arrangement 59 near the third column C3 and interconnects the output terminal of all detection cells 33, 34 and 35 of the second row R2.

Not shown in FIG. 11 are the current input and the current output of the sensor arrangement 59, the input selection circuit that interconnects the current input to one or more of the input leads 60, 61, 62 by means of controllable switches and the output selection circuit that interconnects one or more of the output leads 66 or 67 to the current output by means of controllable switches.

It is to note that again, the arrangement, the sizes and the spacing of the different elements of the sensor arrangement 59 such as the detection cells, the input and output leads are not to scale.

As shown in FIG. 11, all input leads 60, 61 and 62 and all output leads 66 and 67 are routed at the edge of the sensor arrangement 59 near the third column C3. However, in this case the input and output leads of the detection cells of the first column C1 become longer than in a sensor arrangement where the input and output leads are routed through a gap between two central columns (or rows). Or in other words, if the input and output leads are routed through a central gap, the length of the input and output leads of the different detection cells does vary less than in the case where the input and output leads are routed along an edge or through a gap between two outer columns or rows.

It is clear for one skilled in the art that the roles of the rows and columns of the sensor arrangement 59 may also be reversed.

Figure 12:
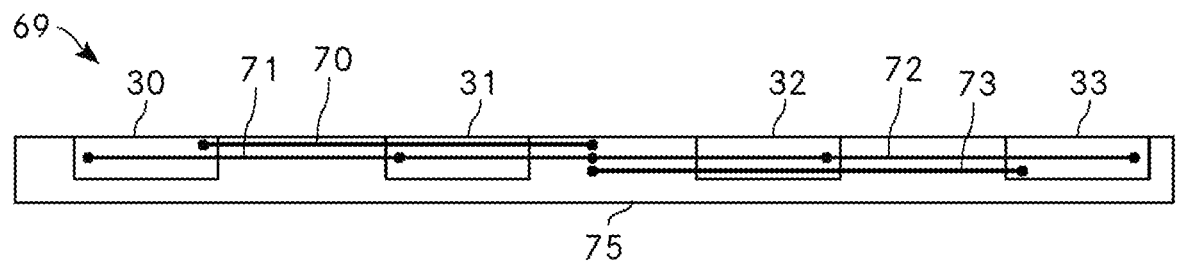
FIG. 12 is a schematic representation of a single layer sensor arrangement with leads arranged one above the other.

FIG. 12 shows a single layer sensor arrangement 69 with leads arranged one above the other in a side view. The sensor arrangement 69 is provided on a support structure such as a multilayer PCB 75 such that the detection cells 30, 31, 32, and 33 of the sensor arrangement 69 are provided on an upper surface of the PCB 75 or embedded in corresponding recesses respectively. A number of input and output leads 70, 71, 72, 73 are provided to connect the detection cells 30, 31, 32, and 33 to a current input and a current output respectively.

A black dot in FIG. 12 means that the corresponding line is perpendicular to the drawing plane.

FIG. 12 shows that some of the input and/or output leads of the sensor arrangement 69 are arranged one above the other such as to minimise the voltage induced in the leads by an external magnetic field. In the sensor arrangement 69, the multilayer PCB 75 includes three conductive layers in which the input and output leads 70, 71, 72, 73 are provided.

Figure 13:
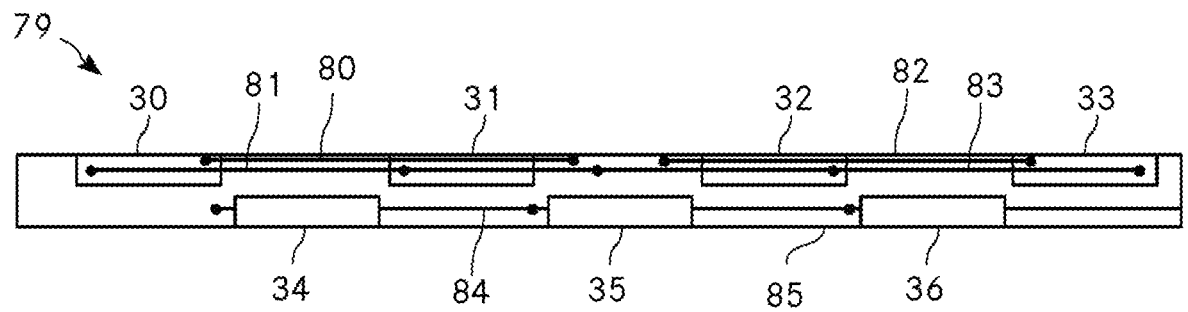
FIG. 13 is a schematic representation of a double layer sensor arrangement.

FIG. 13 shows a double layer sensor arrangement 79 in a side view. The sensor arrangement 79 is provided on a support structure such as a multilayer PCB 85 and includes two layers of detection cells where each layer includes a matrix-like structure of detection cells. The first layer includes detection cells 30, 31, 32, and 33 provided on an upper surface of the PCB 85 or embedded in corresponding recesses respectively. The second layer includes detection cells 34, 35 and 36 provided on a lower surface of the PCB 85 or embedded in corresponding recesses respectively.

A number of input and output leads 80, 81, 82, 83 and 84 are provided to connect the detection cells 30, 31, 32, and 33 to a current input and a current output respectively. Again, the input and output leads are provided on different conductive layers of the multilayer PCB 85. A black dot again means that the corresponding line is perpendicular to the drawing plane.

FIG. 13 shows that the two layers of detection cells are arranged offset to each other such that the detection cells of one layer cover the interspaces between the detection cells of the other layer in order to reduce blind spots or areas with decreased detection sensitivity.

Figure 14:
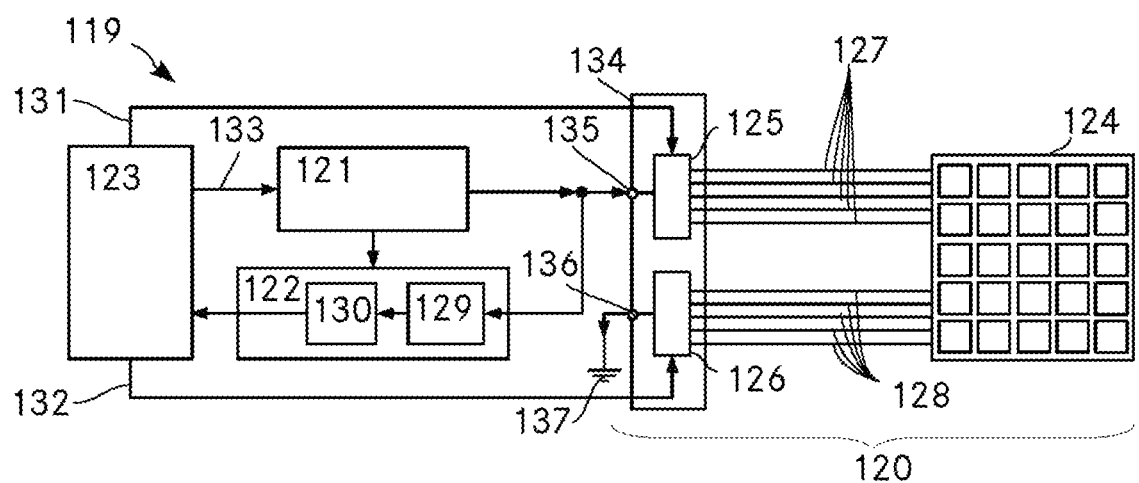
FIG. 14 is a schematic representation of a foreign object detection device according to the embodiments of the disclosure.

FIG. 14 shows a simplified block diagram of a foreign object detection FOD device 119 with a sensor arrangement 120 according to the embodiments of the disclosure. The FOD device 119 further includes a stimulation unit 121, a measuring unit 122 and a signal processing and control unit 123. The sensor arrangement 120 includes a sense coil mat 124 with a PCB as a support structure, a detection cell selection circuit 134 with a first multiplexing unit 125 as input selection circuit and a second multiplexing unit 126 as output selection circuit. The sensor arrangement 120 includes one current input 135 and one current output 136.

The first multiplexing unit 125 is a demultiplexer with one input and five outputs. The outputs of the demultiplexer are connected to the input leads 127 of the sensor arrangement 120. The input of the demultiplexer is connected to the current input 135 of the sensor arrangement 120. The second multiplexing unit 126 is a multiplexer with five inputs and one output. The inputs of the multiplexer are connected to the output leads 128 of the sensor arrangement 120, the output of the multiplexing unit 126 is connected to the current output 136 of the sensor arrangement 120, which is connected to ground 137.

The sense coil mat 124 includes an array of five times five detection cells. Each of the detection cells can be selected by means of the two multiplexing units 125, 126. The output of the stimulation unit 121 is connected to the input of the first multiplexing unit 125. A filter input of a band-pass filter 129 of the measurement unit 122 is connected to the current input 135. The measurement unit 122 further includes an Analogue-to-Digital-Converter (ADC) 130, which is connected to the output of the band-pass filter 129. The passband of the band-pass filter 129 includes the resonant frequencies of the resonant tanks of the detection cells of the sensor arrangement, here having a frequency of about 900 kHz. The stop bands eliminate frequencies related to the operating frequency of the power transfer field, which is here for example 45 kHz.

The band-pass filter 129 is optional and also may be replaced by a high pass-filter. In addition or instead the band-pass filter 129, the measurement unit 122 can also include a signal conditioning module, for instance in order to scale the signal or convert the signal.

The signal processing and control unit 123 is connected with its input to the output of the ADC 130. It also has a row selection control output 131 connected to the first multiplexing unit 125, a column selection control output 132 connected to the second multiplexing unit 126, and a trigger control output 133 connected to the input of the stimulation unit 121.

The signal processing and control unit 123 includes a microcontroller, e.g. a digital signal controller, an FPGA and/or an ASIC. The function of the microcontroller can be implemented by means of an FPGA and/or an ASIC. The signal processing and control unit 123 includes a storage for the sampled data acquired by means of the ADC 130. In an implementation, it includes a means, which allows reconstructing the stimulation signal, as for instance a storage for the time stamps of the trigger events of the stimulation signals. Alternatively, the measurement unit 122 can include another signal channel for the acquisition of the stimulation signal. The signal processing and control unit 123 then also includes a data storage for the acquired samples of the stimulation signal.

The signal processing and control unit 123 is configured to calculate a parameter related to the series impedance of a selected detection cell, based on the sampled electrical signal and the stimulation signal.

Figure 15:
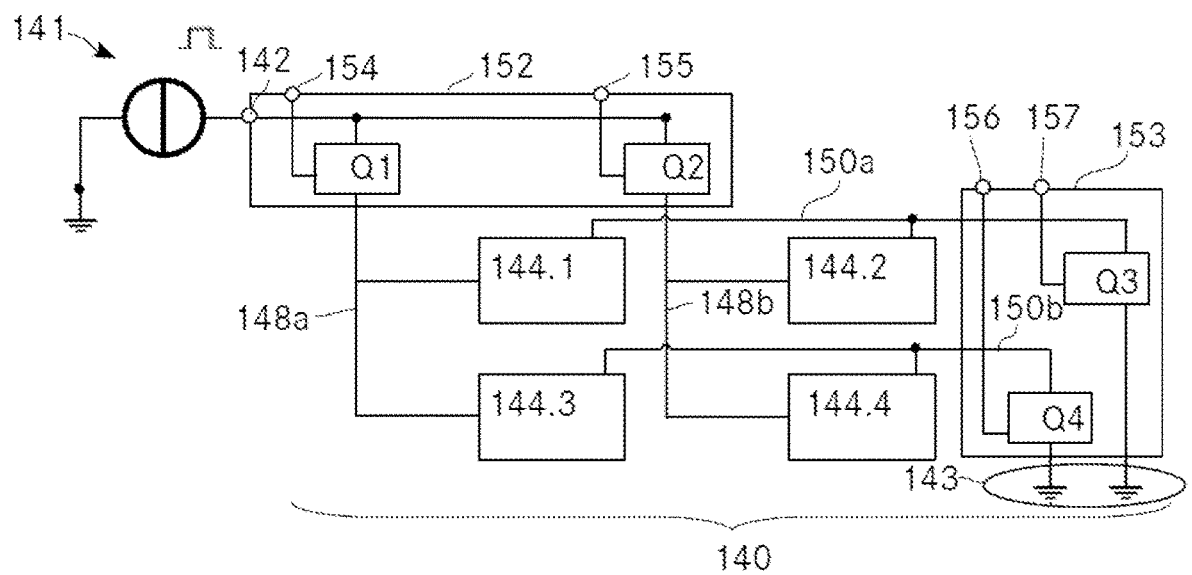
FIG. 15 is a schematic representation of a sensor arrangement according to the embodiments of the disclosure.

FIG. 15 shows a schematic circuit diagram of an embodiment of the inventive sensor arrangement 140 together with a stimulation unit 141. The sensor arrangement 140 includes a current input 142 and a current output 143, which is constituted by a ground connection. The current input 142 is connected to the output of the stimulation unit 141. The sensor arrangement 140 includes four detection cells, namely the first detection cell 144.1, the second detection cell 144.2, the third detection cell 144.3 and the fourth detection cell 144.4, which are arranged in a matrix-like structure including two rows and two columns.

Each of the four detection cells 144.1, 144.2, 144.3 and 144.4 for example includes a sense coil and a capacitor arranged in parallel, the sense coil and the capacitor forming a parallel resonant tank. Each of the detection cells 144.1, 144.2, 144.3 and 144.4 may further includes a diode connected in series with its cathode to a first terminal of the parallel resonant tank of the respective detection cell 144.1, 144.2, 144.3 and 144.4.

The first detection cell 144.1 and the second detection cell 144.2 are part of the first row, while the third detection cell 144.3 and the fourth detection cell 144.4 are part of the second row. A first input lead 148*a* is connected to the input of the first detection cell 144.1, which is part of the first row and to the third detection cell 144.3, which is part of the second row. Likewise, a second input lead 148*b* is connected to the second detection cell 144.2, which is part of the first row and to the fourth detection cell 144.4, which is part of the second row. The detection cells belonging to the first row are connected with their second terminals to a first output lead 150*a*. Similarly, the detection cells belonging to the second row are connected with their second terminals to a second output lead 150*b*.

The number of detection cells and the total number of input leads and output leads for this embodiment is four and therefore there are as many detection cells as input and output leads together.

The sensor arrangement further includes an input selection circuit 152 including a first switch Q1 and a second switch Q2, where the switches Q1, Q2 may for example be implemented as MOSFETs. The first switch Q1 is connected between the current input 142 and the first input lead 148*a* and the second switch Q2 is connected between the current input 142 and the second input lead 148*b*. By addressing either the first switch Q1 or the second switch Q2, a column of the 2×2 sensor matrix can be selected.

Further, the sensor arrangement 140 includes an output selection circuit 153 including a third switch Q3 and a fourth switch Q4. The third switch Q3 is connected between the first output lead 150*a* and the current output 143, which in this embodiment is connected to the electrical ground, and the fourth switch Q4 is connected between the second output lead 150*b* and the current output 143. By addressing either, the third switch Q3 or the fourth switch Q4 a row of the 2×2-sensor matrix can be selected.

The input selection circuit 152 as well as the output selection circuit 153 include two control inputs 154, 155, 156, 157 that are connected to the control inputs of the respective switches Q1, Q2, Q3, and Q4. By means of these control inputs 154-157 the different switches Q1, Q2, Q3, and Q4 can be addressed and therewith the detection cells be selected.

The stimulation unit 141 is configured to generate a rectangular current pulse, to stimulate an electrical oscillation in the parallel tank of the selected detection cell. It includes a current source and an internal switch, which is not shown in FIG. 15.

An excited electrical oscillation in a selected detection cell yields to an oscillating voltage between the current input 142 and the current output 143 (ground), which can, for example, be sensed with an ADC connected with its terminals between the current input and ground.

Figure 16:
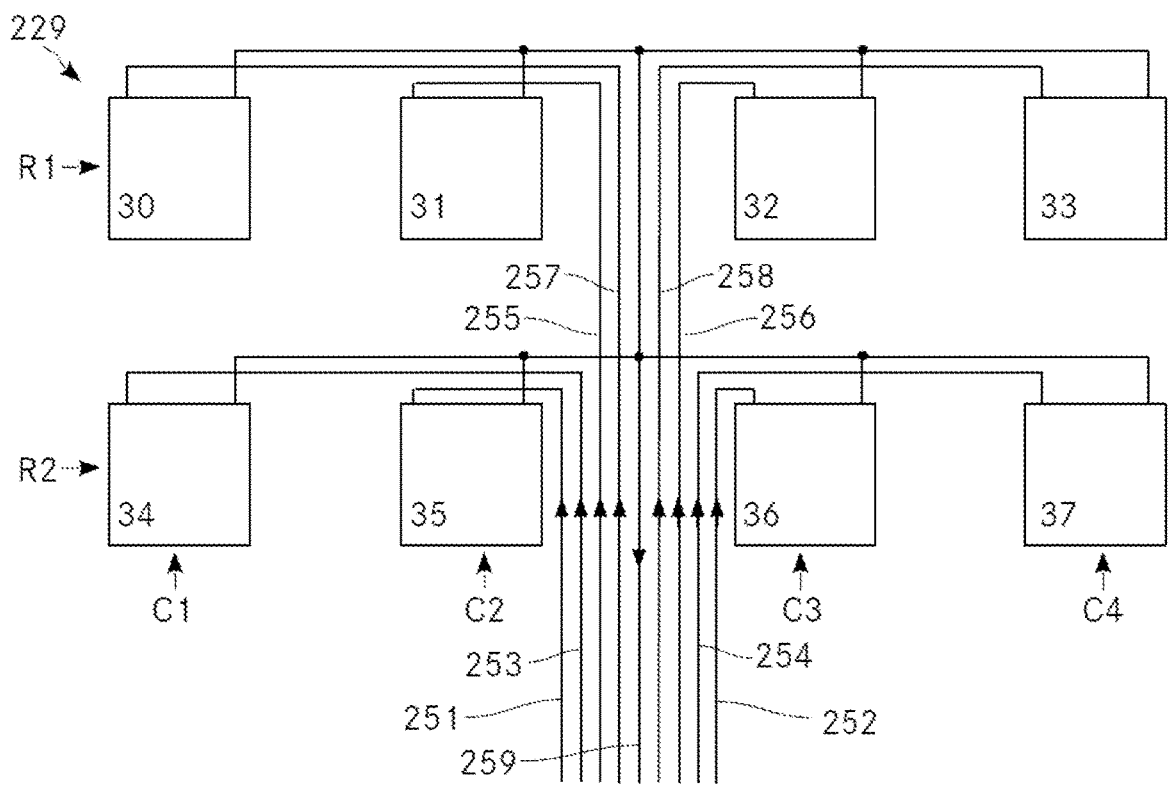
FIG. 16 is a schematic representation of a further sensor arrangement according to the embodiments of the disclosure.

FIG. 16 shows a schematic representation of another sensor arrangement 229 according to the embodiments of the disclosure. The sensor arrangement 229 includes 8 detection cells 30-37 arranged in a matrix-like structure with two rows R1 and R2 and four columns C1, C2, C3 and C4 where the first row R1 includes detection cells 30, 31, 32 and 33,
the second row R2 includes detection cells 34, 35, 36 and 37,
the first column C1 includes detection cells 30 and 34,
the second column C2 includes detection cells 31 and 35,
the third column C3 includes detection cells 32 and 36, and
the fourth column C4 includes detection cells 33 and 37.

Each detection cell includes any sense coil as described above or known in the art, particularly a sense coil according to the embodiments of the disclosure as described above.

In this embodiment of the disclosure, each detection cell of the sensor arrangement 229 includes its own input lead 251-258 that is fed into the matrix-like structure and to each of the detection cells separately from the input leads of the other detection cells.

All input leads 251-258 enter the matrix-like structure between the two central columns C2 and C3, run in parallel until they are connected to their respective detection cell.

The sensor arrangement 229 further includes just a single output lead 259 that interconnects the output terminal of all detection cells 30-37 and then leaves the matrix-like structure between the two central columns C2 and C3. Particularly, the single output lead 259 is arranged in the centre of the input leads 251-258, in this case between the input leads 257 and 258.

As only a single output lead 259 exists, such a sensor arrangement usually does not include an output selection circuit to connect one or more of the output leads to the current output. In this case, the single output lead 259 is directly connected to the current output.

Accordingly, a particular detection cell may be activated by connecting the input lead of that detection cell to the current input by means of the input selection circuit. And the output lead of that detection cell is permanently connected to the current output.

Not shown in FIG. 16 are the current input and the current output of the sensor arrangement 229 and the input selection circuit that interconnects the current input to one or more of the input leads 251-258 by means of controllable switches.

It is to note that the arrangement, the sizes and the spacing of the different elements of the sensor arrangement 229 such as the detection cells, the input and output leads are not to scale.

As shown in FIG. 16, all input leads 251-258 and the single output lead 259 are routed through the gap between the two central columns C2 and C3. And they are arranged such that the input and output leads of a particular detection cell are as near as possible arranged next to each other to minimise the area enclosed by the loop formed by the input and output lead of that detection cell. In the case of a double D arrangement, this can be, for example, in the middle between the two poles.

It is clear for one skilled in the art that the roles of the rows and columns of the sensor arrangement 229 may also be reversed.

In summary, it is to be noted that the embodiments of the disclosure enable to create a sensor arrangement for a foreign detection device that ensures a more uniform sensitivity for the detection of foreign objects across the surface of the transmitting unit.

And further it is to be noted that the embodiments of the disclosure enable to create a sensor arrangement for a foreign object detection device with a minimized hardware effort and a minimized total length of the input and output leads as well as a sensor arrangement for a foreign object detection device that reduces the voltages induced in the input and output leads of the single detection cells by reducing the area that is enclosed by the input and output leads of the cells and that can be flowed through by the external magnetic field. The reduced voltages induced in the input and output leads minimizes interference effects and distortions of the foreign object detection by an external magnetic field such as the power transfer field of the wireless power transfer system.

What is claimed is:

1. Sensor arrangement for a foreign object detection device for a wireless power transfer system, comprising:
    a current input and a current output;
    a plurality of detection cells, each comprising a sense coil including a winding spirally wound in a plane and having a plurality of turns;
    a plurality of input leads and one or more output leads, wherein each detection cell is connected between one of the input leads and one output lead, and each detection cell is connected to a different combination of input and output leads, and
    an input selection circuit adapted to selectively establish an electrical connection between the current input and one or more of the input leads,
    wherein the sense coil of at least one detection cell comprises an outer coil section and an inner coil section arranged inside the outer coil section, and a first distance between an outermost turn of the inner coil section and an innermost turn of the outer coil section is at least twice a largest distance between two turns of the outer coil section.

2. Sensor arrangement according to claim 1, wherein the sense coil of the at least one detection cell comprises a plurality of turns in the outer coil section and a single turn in the inner coil section.

3. Sensor arrangement according to claim 2, wherein the first distance is equal to a distance of the single turn in the inner coil section and a centre of the sense coil of the at least one detection cell.

4. Sensor arrangement according to claim 1, wherein a distance between a centre of the sense coil of the at least one detection cell and an innermost turn of the inner coil section is equal to or smaller than two thirds of a distance between the centre of the sense coil and the outermost turn of the outer coil section.

5. Sensor arrangement according to claim 1, wherein the turns of the outer coil section of the at least one detection cell are arranged equally distant to each other.

6. Sensor arrangement according to claim 1, wherein the sense coils are arranged in one or more layers, and wherein the sense coils of each layer are arranged in a regular pattern.

7. Sensor arrangement according to claim 1,
    wherein the sense coils are arranged in one or more layers, and the sense coils of a particular layer are arranged in a matrix-like structure with multiple rows and multiple columns, and
    wherein the input lead and the output lead of at least one sense coil is routed through the matrix-like structure to which the at least one sense coil belongs close to each other such as to reduce an area parallel to said matrix-like structure and enclosed by said input and output leads.

8. Sensor arrangement according to claim 7, wherein the input leads and the output leads of each sense coil of a particular layer are routed through a gap between two columns or two rows of the matrix-like structure.

9. Sensor arrangement according to claim 7, wherein the input leads and the output leads of each sense coil of a particular layer are routed through a gap between two central columns or two central rows of the matrix-like structure.

10. Sensor arrangement according to claim 7, wherein a distance between the input lead and the output lead of said at least one sense coil is smaller than a distance between two rows or two columns of the matrix-like structure.

11. Sensor arrangement according to claim 7, wherein the input lead and the output lead of said at least one sense coil are arranged one above the other.

12. Sensor arrangement according to claim 7, wherein the input lead and the output lead of the at least one sense coil are twisted at least once.

13. Sensor arrangement according to claim 1, further comprising an output selection circuit adapted to selectively establish an electrical connection between one or more of the output leads and the current output.

14. Sensor arrangement according to claim 1, wherein the sense coil of the at least one detection cell has a rectangular shape.

15. A foreign object detection device for a primary part of a wireless power transfer system for transferring power over an air gap to a nearby receiver, comprising:
    a sensor arrangement, comprising:
        a current input and a current output;
        a plurality of detection cells, each comprising a sense coil including a winding spirally wound in a plane and having a plurality of turns, wherein the sense coils of the detection coils are arranged in one or more layers, and the sense coils of a particular layer are arranged in a matrix-like structure with multiple rows and multiple columns;
        a plurality of input leads and one or more output leads, wherein each detection cell is connected between one of the input leads and one output lead, and each detection cell is connected to a different combination of input and output leads, and the input lead and the output lead of at least one sense coil is routed through the matrix-like structure to which the at least one sense coil belongs close to each other such as to reduce an area parallel to said matrix-like structure and enclosed by said input and output leads; and
        an input selection circuit adapted to selectively establish an electrical connection between the current input and one or more of the input leads;
    a stimulus circuit for generating a predetermined stimulation signal, connected to the current input of the sensor arrangement;

a measurement unit, adapted to sense an electrical signal applied to said current input, the measurement unit comprising an analogue to digital converter for acquiring sampling data representing the sensed electrical signal, and a signal processing unit configured to determine time response data of a selected detection cell based on the sampling data acquired by the measurement unit.

16. The foreign object detection device according to claim 15, wherein the sense coil of at least one detection cell comprises an outer coil section and an inner coil section arranged inside the outer coil section, and a first distance between an outermost turn of the inner coil section and an innermost turn of the outer coil section is at least twice a largest distance between two turns of the outer coil section.

17. The foreign object detection device according to claim 16, wherein the sense coil of the at least one detection cell comprises a plurality of turns in the outer coil section and a single turn in the inner coil section.

18. The foreign object detection device according to claim 15, wherein the input leads and the output leads of each sense coil of a particular layer are routed through a gap between two columns or two rows of the matrix-like structure.

19. A primary part for a wireless power transfer system for transferring power over an air gap to a nearby receiver, configured to generate a magnetic field in an active area at a transmission frequency, the primary part comprising a sensor arrangement comprising:

a current input and a current output;

a plurality of detection cells, each comprising a sense coil including a winding spirally wound in a plane and having a plurality of turns;

a plurality of input leads and one or more output leads, wherein each detection cell is connected between one of the input leads and one output lead, and each detection cell is connected to a different combination of input and output leads, and an input selection circuit adapted to selectively establish an electrical connection between the current input and one or more of the input leads;

wherein the sense coil of at least one detection cell comprises an outer coil section and an inner coil section arranged inside the outer coil section, and a first distance between an outermost turn of the inner coil section and an innermost turn of the outer coil section is at least twice a largest distance between two turns of the outer coil section, and wherein the sense coils of the detection cells are arranged in a way that a sensing area defined by the sense coils at least partly covers the active area.

20. The primary part for a wireless power transfer system according to claim 19, wherein the sense coils of the detection cells are arranged in a way that the sensing area entirely covers the active area.

\* \* \* \* \*